(12) United States Patent
Gecim et al.

(10) Patent No.: US 8,347,992 B2
(45) Date of Patent: Jan. 8, 2013

(54) ELECTRICALLY-VARIABLE ACCESSORY DRIVE FOR ENGINE START

(75) Inventors: Burak A. Gecim, Carmel, IN (US); William C. Deneszczuk, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 202 days.

(21) Appl. No.: 12/859,817

(22) Filed: Aug. 20, 2010

(65) Prior Publication Data
US 2012/0043145 A1 Feb. 23, 2012

(51) Int. Cl.
*B60W 10/04* (2006.01)
(52) U.S. Cl. ............ 180/65.265; 180/65.28; 180/65.285
(58) Field of Classification Search ..... 180/65.21–65.29
See application file for complete search history.

(56) References Cited

U.S. PATENT DOCUMENTS

| 7,028,794 | B2 * | 4/2006 | Odahara et al. | 180/65.25 |
| 8,030,881 | B2 * | 10/2011 | Owens et al. | 320/104 |
| 2008/0096711 | A1 | 4/2008 | Smith et al. | |

OTHER PUBLICATIONS

Goro Tamai, et al., "Development of the Hybrid System for the Saturn VUE Hybrid", SAE 2006-01-1502.
Kenji Itagaki, et al., "Development of the Toyota Mild-Hybrid System (THS-M)" SAE 2002-01-0990.

* cited by examiner

*Primary Examiner* — Jeffrey J Restifo
*Assistant Examiner* — Erez Gurari

(57) ABSTRACT

A hybrid powertrain system includes an internal combustion engine mechanically coupled through a planetary gear set to an accessory drive and a torque machine. Operator inputs and engine operating parameters are monitored to select an operational state including one of an autostop accessory control state, autostart operation state, engine torque assist state, and energy power generation state.

16 Claims, 3 Drawing Sheets

ELECTRICALLY-VARIABLE ACCESSORY DRIVE FOR ENGINE START

TECHNICAL FIELD

This disclosure is related to hybrid vehicles with engine starting and engine assist features.

BACKGROUND

The statements in this section merely provide background information related to the present disclosure and may not constitute prior art.

Hybrid electric vehicles (HEV) can selectively use different energy sources for propulsion as needed in order to achieve optimal fuel efficiency. An HEV can selectively use either or both of an internal combustion engine and a torque machine(s) connected to an energy storage device (ESD). If the torque machine is a motor/generator unit (MGU), a high-voltage battery module is used as the ESD for propulsion and operational control.

One HEV includes a hybrid powertrain including an engine stop/start system wherein the engine automatically shuts down during ongoing vehicle operation (autostop) and automatically restarts (autostart) using the torque machine(s). The hybrid powertrain system preferably includes a regenerative braking system for recharging the ESD via the torque machine(s) and the ability to selectively shut down the engine during vehicle idle, referred to as an autostop event.

The high-voltage MGU can be used as a belt-alternator-starter (BAS) system in lieu of an alternator. The BAS applies torque to a serpentine belt of the engine when a driver signals an intention to resume travel after an autostop event. Torque from the torque machine can spin the engine for a short duration to crank the engine until it fires and runs. During starting of the engine in response to the operator initiating a key-on state, a crankshaft-mounted auxiliary or 12-volt starter motor can provide cranking torque to crank and start the engine.

A BAS HEV uses a high-voltage battery or energy storage device (ESD) supplying high-voltage electrical power to a voltage inverter within the electrical system of the HEV. After an autostop event, the torque from the torque machine to spin the engine during the engine restart can cause accessory speed to flair. Accessory speed flair occurs when the accessories are spun at a greater rotational speed than expected or intended to be operated at due to an unrestricted torque from the torque machine when attempting to restart the engine. Additionally, during an autostop event, the accessories may not be turned when the engine is shut off, losing feature functionality, e.g., an air conditioner compressor is shut off thereby losing cabin cooling when the engine is off.

SUMMARY

An internal combustion engine is mechanically coupled via a planetary gear set to an accessory drive system and a torque machine. A method for controlling operation of the internal combustion engine includes monitoring operator inputs, monitoring engine operation parameters, and controlling the accessory drive system in response to the operator inputs and the engine operation parameters in one of a plurality of operational states. The operational states include an engine autostop accessory control state including operating the torque machine in a torque generating state and transferring the generated torque to the accessory drive, an engine autostart state including operating the torque machine in the torque generating state and transferring the generated torque to the engine, an engine torque assist state including operating the torque machine in the torque generating state and transferring the generated torque to the engine, and an energy power generation state including operating the torque machine in a power generating state to react engine torque.

BRIEF DESCRIPTION OF THE DRAWINGS

One or more embodiments will now be described, by way of example, with reference to the accompanying drawings, in which.

DETAILED DESCRIPTION

Figure 1:
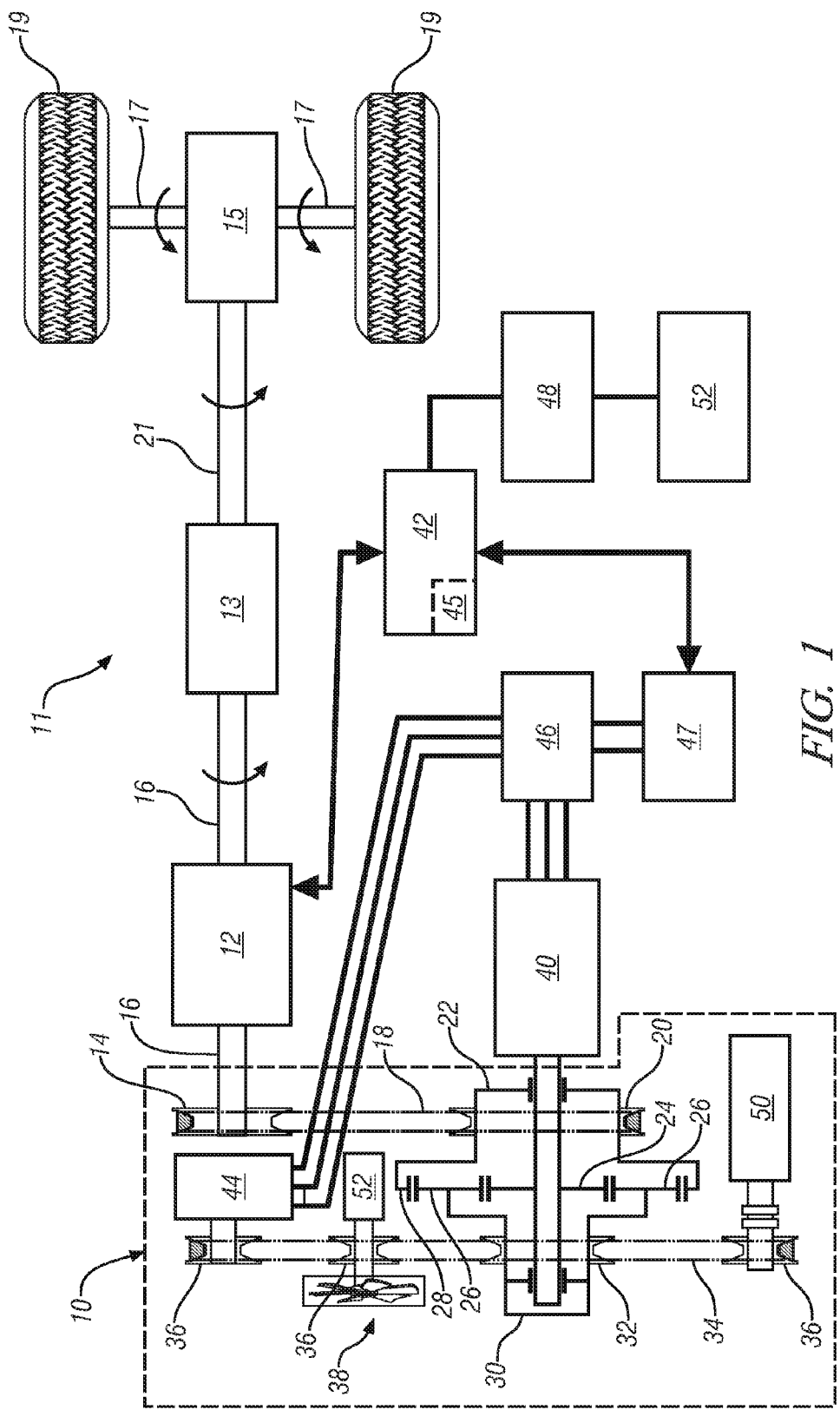
FIG. 1 is a schematic illustration of an accessory drive system for a vehicle having an engine, a planetary gear set, a torque machine, and an accessory brake, in accordance with the present disclosure.

Referring now to the drawings, wherein the showings are for the purpose of illustrating certain exemplary embodiments only and not for the purpose of limiting the same, FIG. 1 is a schematic illustration of a vehicular powertrain system including an accessory drive system 10, engine 12, and torque machine 40. The accessory drive system 10 operatively interconnects the engine 12, torque machine 40, and a plurality of accessories 38 by way of a planetary gear set 22 to effect torque transfer between each.

The engine 12 preferably is an internal combustion engine, e.g., spark-ignition or compression-ignition, configured to generate torque to be transferred by a crankshaft 16 through a drivetrain 11 to at least one wheel(s) 19. The drivetrain 11 further includes a transmission 13 for selectively engaging the crankshaft 16 thereby transferring torque from the engine 12 to a differential 15. The differential 15 transfers the engine torque to at least one axle(s) 17 for transferring tractive torque to at least one wheel(s) 19. The transmission 13 can alter the amount of tractive torque from the engine 12 to the wheels 19 via selectable gearing. It should be appreciated that the transmission 13, differential 15, and wheels 19 may include any known configurations. As will be appreciated by one of ordinary skill in the art, although the drivetrain 11 is described with the internal combustion engine, the disclosure is not so limited. For example, the accessory drive system 10 can be used in conjunction with a series, parallel, or other hybrid drive systems.

A controller 42 controls operation of the engine 12 in one of a plurality of operating states. The operating states can include an engine-on state, an engine-off state, an autostop state, and an autostart state. Engine 12 operation in the engine-on state occurs during a key-on state when the controller 42 detects an operator torque request 48 has occurred from operator input commands 52, e.g., acceleration commands or braking commands. During the engine-on state, the controller 42 selects an amount of the operator torque request 48 to provide torque to the driveline 11. The autostop state occurs when the vehicle is being operated in the key-on state and is stationary. The controller 42 stops the engine 12 during the stationary period thereby preventing fuel usage and increasing overall vehicle fuel economy. The engine 12 executes an autostart state after an autostop state. The controller 42 detects an operator input command 52 signaling that an operator torque request 48 is imminent and restarts the engine 12 in preparation to produce torque when requested. The engine 12 in the engine-off state is selected during a key-off state.

The torque machine 40 is depicted and discussed as a motor/generator in the preferred embodiment but may be any suitable torque machine, e.g., hydraulic and mechanical. When a motor/generator 40 is used, an energy storage device (ESD) 46 and an inverter 47 is used to respectively store electrical potential energy and convert the potential energy between energy used for storage and energy used to control the motor/generator 40. The ESD 46 can be any device capable of storing electrical energy and releasing it when commanded, e.g., a battery or capacitor. The motor/generator 40 can be used to produce torque by using energy from the ESD 46 or convert torque to potential energy and stored within the ESD 46. Operating parameters associated with the ESD 46 include a state of charge, as is appreciated by those skilled in the art.

The accessories 38 provide functions which require torque to operate. Example accessories 38 depicted are an accessory brake 44, an air conditioner compressor 50, and a coolant pump 52 but may include additional or alternative accessories, e.g., torque machine or generator, and power steering pump. It will be apparent to one of ordinary skill in the art that the accessories shown are neither inclusive nor restrictive and the accessories depicted could be added to, removed, or replaced to form other combinations of vehicle accessories 38. The accessories 38 are provided torque through the planetary gear set 22 as discussed below.

The planetary gear set 22 operatively interconnects the engine 12, the motor/generator 40, and the accessories 38. The planetary gear set 22 accepts engine torque transferred by a crank pulley 14 in any known manner such as, for example, using a belt or a power take-off. A first belt or chain 18 couples the crank pulley 14 with an accessory drive input pulley 20 for transferring torque therebetween. The accessory drive input pulley 20 is coupled to the planetary gear set 22 and may be directly coupled to the planetary gear set 22, or may be indirectly coupled to the planetary gear set 22, e.g., through a gear assembly or an additional belt or chain. The planetary gear set 22 is a differential gear and has a plurality of members including a sun gear 24, a plurality of pinions or planet gears 26, a ring gear 28, and a pinion carrier or planet carrier 30.

The planetary gear set 22 is configured to convert the torque of the accessory drive input pulley 20 to a predetermined value selected to efficiently drive various vehicle accessories 38 through a fixed ratio of engine speed. In other words, the planetary gear set 22 can increase or decrease the magnitude of the rotational velocity from the accessory drive input pulley 20 in order to drive the accessories 38 at a more efficient speed and thereby improve fuel economy. Torque from the planetary gear set 22 is transferred to an accessory drive output pulley 32 and is transferred to one or more accessory pulleys 36 via a second belt or chain 34. The accessory pulleys 36 are each coupled to one of the accessories 38.

The accessory brake 44 is depicted as an electrical generator but may be any suitable potential energy conversion device, e.g., hydraulic or mechanical, or lost energy device, e.g., a grounding brake, that is capable of varying an amount of torque applied to the second belt 34. The accessory brake 44 is configured to selectively accept torque between it and one of the members of the planetary gear set 22 as transferred through the accessory pulley 36 and the accessory drive output pulley 32 by the second belt 34. The accessory brake 44 may be configured to transfer power to the ESD 46 for storage therein.

The torque machine 40 is configured to selectively transfer torque to planetary gear set 22 either directly or through a transfer device, e.g., a belt, chain, gear assembly, differential gear, or similar. Transferring a first predetermined amount of input torque from the torque machine 40 to one of the members of the planetary gear set 22, the planetary gear set 22 can be controlled to produce an amount of output torque from another of its members. Therefore, by controlling the amount of torque transferred from the torque machine 40 to the planetary gear set 22, the output speed of the planetary gear set 22 is controllable within a preferred operational range. It should be noted in the disclosed embodiment, both the accessory brake 44, when it is a generator, and the torque machine 40 utilize the same energy type, e.g., electrically operative devices, to facilitate sharing of common parts, e.g., ESD. However, the devices may be of differing types, e.g., the accessory brake 44 can be a mechanical torque device and the torque machine 40 may be hydraulic, and still be within the scope of the disclosure.

The engine 12, torque machine 40, and accessory brake 44 are operatively connected to the controller 42. The controller 42 may also be signally connected to one or more sensors implemented to select a preferred output speed for the planetary gear set 22 and to individually monitor operational parameters and control each of the devices. The controller 42 includes a control algorithm 45 for controlling the accessory drive system 10.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, when the vehicle is stationary and in a key-off state, the accessory drive system 10, engine 12, and torque machine 40 are turned off waiting for a signal from the controller 42 and control algorithm 45 to start operation in response to a key-on state initiated by the operator. Upon entering the key-on state, the vehicle is controlled as if an autostop event has occurred, i.e., the engine 12 is off and the controller 42 operates the torque machine 40 in a torque generation mode to turn the accessory drive system 10 when necessary, as will be described in detail below. Additionally, during the key-on state, the control algorithm 45 monitors the operator input commands 52 for a signal that an operator torque request 48 is imminent, e.g., the operator removes pressure from the brake pedal, and begins an engine autostart event. During the engine autostart event, the engine 12 begins in an off state, the torque machine 40 can be spinning the accessory drive system 10, and the controller 42 has determined the engine 12 is to be started. The control algorithm 45 operates the torque machine 40 to provide torque in excess of an engine breakaway torque thus providing a starting torque to spin the engine 12. At the same time, the control algorithm 45 operates the accessory brake 44 to slow or stop the accessory drive system 10 from spinning thereby transferring additional torque to spin the engine 12 for starting, as will be described in further detail below.

During vehicle acceleration, the control algorithm 45 determines if the engine 12 is capable of supplying the operator torque request 48 or if torque assist is required from the torque machine 40. If a torque assist condition is required, the engine 12 is on and produces torque, the torque machine 40 produces torque, and the accessory brake 44 is engaged to slow down or stop the accessory drive system 10 to provide additional torque to the drivetrain 11, as will be explained in detail below. During steady state or low torque engine operation, the control algorithm 45 may operate the torque machine 40 in an energy power generating state to react engine torque to energy for storage within the ESD 46. During the energy power generating state, the engine 12 produces torque, the torque machine 40 reacts engine torque to energy for storage within the ESD 46, and the accessory drive system 10 is spinning as required, as will be explained in detail below. When the vehicle becomes stopped, an autostop event may begin. The control algorithm 45 recognizes the vehicle is no longer moving and stops the engine 12 from producing torque. However, as in the key-on state above, the accessory drive system 10 can be turned by the torque machine 40 if the control algorithm 45 determines it necessary, as described in detail below.

Figure 2:
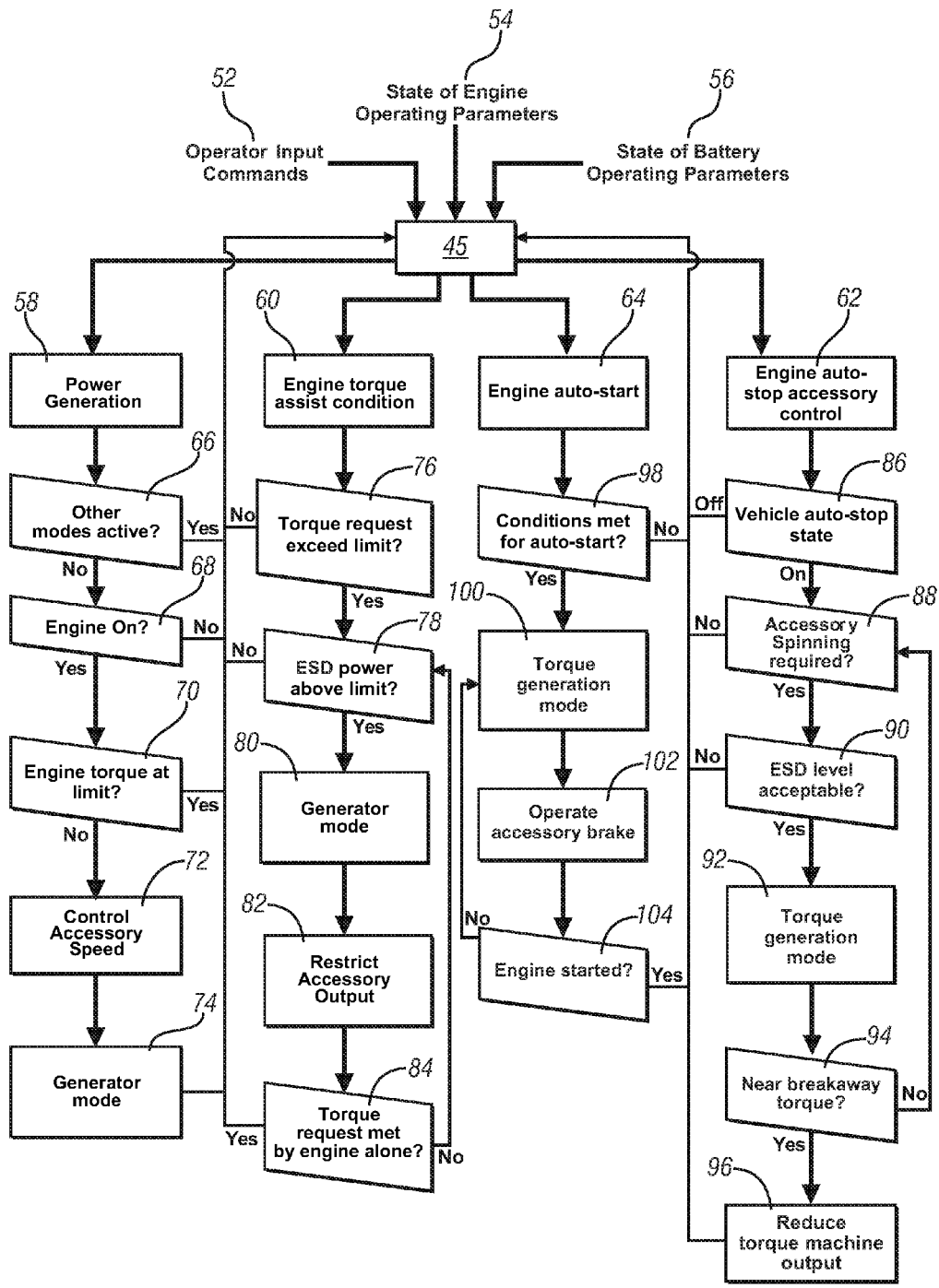
FIG. 2 is a schematic drawing of a control diagram for the accessory drive system including the engine operatively connected to the planetary gear set through the accessory drive input pulley, an accessory brake rotationally connected to the planetary gear set through the accessory drive output pulley, and the power torque machine rotationally interconnected to the planetary gear set each controlled by the controller, in accordance with the present disclosure.

FIG. 2 is a schematic drawing of a control diagram for controlling the accessory drive system 10 where the control algorithm 45 selects an operational state for the accessory drive system 10. Operational states may include an energy power generation state (58), an engine torque assist state (60), an engine autostop accessory control state (62), and an engine autostart state (64). The controller 42 continually monitors the operator input commands 52, states of engine operating parameters 54, and states of ESD/inverter operating parameters 56 to select a preferred operational state for operating the engine 12, torque machine 40, and accessory brake 44. The energy power generation state (58) is a state in which the engine 12 is producing the operator torque request 48 and provides additional torque to turn the torque machine 40 to generate electrical power. The engine torque assist state (60) is selected when the engine 12 is at or near a predetermined torque output capacity and the torque machine 40 generates torque to transfer to the driveline 11. The engine autostop accessory control state (62) is selected when the control algorithm 45 recognizes the vehicle has come to a stop, stops the engine 12, monitors accessory output, and provides torque to the accessory drive system 10 using the torque machine 40. The engine autostart state (64) is a mode when the engine 12 is in the autostop accessory control state (62) and the control algorithm 45 monitors operator input commands 52 to determine when an increase in the operator torque request 48 is likely and preemptively starts the engine 12.

When the engine 12 is operating, the controller 42 receives input from the engine 12 through the engine operating parameters 54 indicating the current operation parameters, including engine speed and torque output. The control algorithm 45 selects an energy power generation state (58) by checking if the engine is operational (66) and is producing torque. If the engine 12 is not operational, the control algorithm 45 returns to select operation in another state. If the engine 12 is on and producing torque (66), the control algorithm 45 determines if another operating state for the accessory drive system is active (68). If another operating state is active (68), the control algorithm 45 maintains operation in that state. If no other operating state is active (68), the control algorithm 45 determines if the engine torque is at the predetermined limit (70), e.g., torque production near operational limits. If the engine torque is at the predetermined limit (70), the control algorithm 45 returns to determine operation in another state. If the engine torque is not at the predetermined limit (70), the control algorithm 45 calculates a corresponding power torque machine torque value and an accessory brake value required to control the accessory speed (72) at an efficient level. The control algorithm 45 operates the torque machine 40 and the accessory torque machine 44 in generator mode (74) to react engine torque into energy for storage within the ESD 46. If the ESD is near a maximum desired capacity, the energy may be diverted for immediate use or not generated.

An exemplary energy power generation state (58) state may be selected when the vehicle is in motion. For example, if the engine 12 is running at 4,000 rpm and the accessories 38 are optimized to run at 1,500 rpm, the control algorithm 45 calculates the power torque machine speed and the accessory brake speed required to produce a planetary gear set 22 output speed of 1,500 rpm. These types of calculations which utilize the ring/sun tooth ratios of a planetary gear set 22 and an accessory brake 44 are well known to those of ordinary skill in the art and therefore will not be described in detail hereinafter. After calculating the output speed, the control algorithm 45 commands the torque machine 40 and the accessory brake 44 to transfer the required amount of torque to the planetary gear set 22 such that the accessories 38 are driven in an efficient manner, in this example, around 1,500 rpm.

When the engine 12 is operating, the control algorithm 45 receives input from the engine 12 through the state of engine operating parameters 54 indicating the current engine operation, including engine speed and torque output. The control algorithm 45 selects an engine torque assist state (60) by first checking to see if the operator torque request 48 exceeds a predetermined level based upon the engine capabilities (76). If the operator torque request 48 does not exceed the predetermined limit, the control algorithm 45 returns to determine operation in another state. If the operator torque request exceeds the predetermined limit (76), then the control algorithm 45 verifies the ESD power is above predetermined operational limits (78). The control algorithm 45 will verify current engine operating parameters 54 and state of ESD operating parameters 56 which can include environmental conditions, percent ESD charge, and rate of discharge. If the ESD power is at or below the operational limits, the control algorithm 45 returns to determine operation in another state. If the ESD power is above predetermined operational limits (78) then the controller 42 begins operation of the power torque machine in a torque generation mode (80). The control algorithm 45 selects the amount of torque necessary to meet the current operator torque request and determines if the accessory output should be restricted (82) by actuating the accessory torque machine 44 to reduce the amount of torque being consumed by the accessories 38 and provide extra torque to the driveline 11. The control algorithm 45 determines if the operator torque request 48 has changed and is able to be met by the engine (84). If the operator torque request 48 has changed, the control algorithm 45 returns to determine operation in another state. If the engine 12 is still unable to provide enough torque to meet the operator torque request (82), the control algorithm 45 returns to verify ESD power is above predetermined limits at (78) and proceeds through the decision string. One of ordinary skill in the art will recognize the predetermined limits can be changed from one cycle to the next to compensate for battery usage and environmental factors.

An exemplary engine torque assist state (60) operation may be selected during vehicle operation with the engine 12 in providing torque to the driveline 11 and a high operator torque request is received. The torque machine 40 is then requested to provide a torque assist to the engine 12. The control algorithm 45 is monitoring engine torque output based upon engine operating parameters 54. When the control algorithm 45 detects an appropriate high torque condition, e.g., heavy acceleration such as a passing situation or acceleration from a standstill, the control algorithm 45 commands the torque machine 40 to provide additional torque that is transferred from the planetary gear set 22 to the crank pulley 14 which aids in spinning the engine 12 thereby providing additional tractive torque through the drivetrain 11 to the wheels 19. The control algorithm 45 recognizes the additional torque generation of the torque machine 40 and controls the accessory brake 44 to maintain or minimize the speed of the accessories 38, thereby preventing torque loss through accessory flair and excessive spinning of the accessories 38.

When the engine is operating, the control algorithm 45 receives input from the engine 12 through the engine operating parameters 54 indicating the current engine operation, including engine speed and torque output, as well as operator torque request 48 and the state of ESD operating parameters 56. The control algorithm 45 selects an engine autostop accessory control state (62) by first determining if the vehicle is in the autostop state (86), as discussed above. If the engine 12 is not in the autostop state (86), the control algorithm 45 returns to determine operation in another state. If the engine 12 is in the autostop state (86), then the control algorithm 45 determines if accessory operation is required (88) by determining if the operator input commands 52 or engine operating parameters are requesting operation of accessories, e.g., if air conditioning is requested or the engine requires coolant flow. If accessory operation is not required, the control algorithm 45 returns to determine operation in another state. If accessory operation is required (88), the control algorithm 45 determines the present ESD level (90) to determine whether the level is above a predetermined level to allow for power torque machine operation. If the ESD is not above the predetermined level, the control algorithm 45 returns to determine operation in another state. If the ESD is above the predetermined level (90), the control algorithm 45 operates the power torque machine in torque generator mode (92) to provide torque to the accessories 38. The control algorithm 45 then determines if the engine 12 is near the engine breakaway torque (94) to maintain torque being received at the engine below the breakaway torque (94). If the engine 12 is not near the engine breakaway torque, the control algorithm 45 returns to check if accessory spinning is required (88) to verify the operational states. If the engine 12 is near the breakaway torque, the control algorithm 45 selects a reduced torque from the torque machine (96) to continue spinning the accessories 38.

In operation, when the vehicle stops, an engine autostop state begins wherein the engine 12 is stopped and the control algorithm 45 monitors operator input devices 52, e.g., an accelerator control and brake control, for an indication whether an operator torque request 48 is about to begin, e.g., the brake control is no longer active. The control algorithm 45 monitors state of engine operating parameters 54, e.g., engine on/off condition and accessory usage or demand, and commands the inverter 47 to provide power from the ESD 46 to the torque machine 40 to start a mechanical torque generating state.

In the torque generating state, the torque machine 40 provides torque to the planetary gear set 22. The engine 12 is in an off state and therefore provides rotational resistance across the accessory drive input pulley 20 thereby acting as a brake against the torque transferred from the planetary gear set 22. The torque from the torque machine 40 is then transferred to the accessories 38 through the planetary gear set 22 to spin the accessories 38 at a predetermined speed. The engine 12 is an effective brake until such time as the static breakaway torque is achieved. Static breakaway torque is the torque required to overcome internal resistance of an engine thereby allowing the engine 12 to spin as signified by crankshaft 16 rotation. Therefore, the control algorithm 45 monitors the torque output of both the torque machine 40 and the accessory brake 44 in relation to the static breakaway torque threshold for the engine 12. Before the static breakaway torque is met, the control algorithm 45 is able to operate the torque machine 40 to prevent the engine 12 from reaching the static breakaway threshold. One of ordinary skill in the art will recognize the amount of torque required to spin the accessories 38 at a certain speed will be variable based on the load requirement for each accessory during operation.

When the engine 12 is in the autostop state, the control algorithm 45 also selects when an engine autostart is required (64). The control algorithm 45 is monitoring the operator input commands 52 to determine if specific conditions are met, e.g., an operator has removed pressure from a brake control, to indicate an operator torque request is imminent (98). If the control algorithm 45 does not recognize any conditions, the controller 42 returns to determine operation in another state. If the control algorithm 45 recognizes conditions have been met (98), the control algorithm 45 operates the power torque machine in a torque generation mode (100). The control algorithm 45 further selects when and how much the accessory brake should be operated (102). The control algorithm 45 then checks to see if the engine 12 has started (104). If the engine 12 has started, the control algorithm 45 returns to determine operation in another state. If the engine 12 has not started, the control algorithm 45 operates the power torque machine in torque generation mode (100) and continues the decision string until the engine 12 has been started (104).

In operation, with the engine 12 in an autostop mode, the control algorithm 45 monitors the operator input commands 52 for a signal that an operator torque request 48 is imminent, e.g., the operator removes pressure from the brake pedal, an engine autostart operation begins. The control algorithm 45 begins the autostart state (64) by increasing torque output of the torque machine 40 providing additional torque to the planetary gear set 22. The accessory drive input pulley 20 transfers torque to turn the belt or chain 18 which provides torque to the crank pulley 14 to overcome the static breakaway torque. Once the static breakaway torque is overcome, the crankshaft 16 begins to rotate and the engine 12 can be fueled and spark applied to cause the engine 12 to start. When the engine 12 has started, the engine 12 is able to provide tractive torque to the wheels 19 through the drivetrain 11. When the torque machine 40 provides torque to the planetary gear set 22 to start the engine 12, the sudden increase of torque can cause the accessory belt to temporarily turn at a greater speed than is desired thereby causing accessory flare. The accessory brake 44 is configured to receive a command from the control algorithm 45 through the inverter 47 to provide a restrictive or counter torque to the accessory belt 34 for maintaining the speed of the accessories 38. The restrictive or counter torque prevents accessory flair and provides additional torque to start the engine 12 through reducing torque loss. One of ordinary skill in the art will also recognize that the restrictive or counter torque provided by the accessory brake 44 can be such that the accessories become stopped thereby providing available torque from the torque machine 40 to restart the engine 12.

Figure 3A:
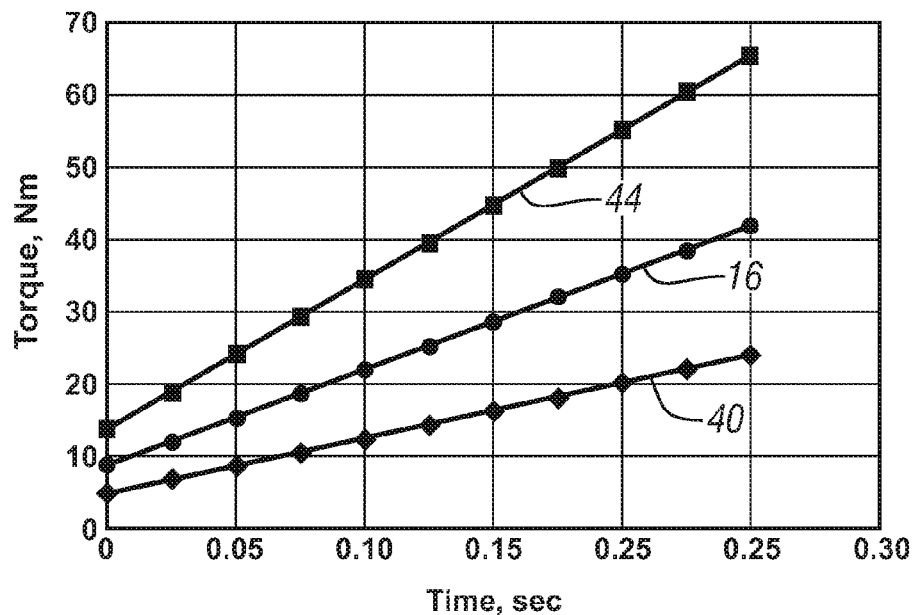
FIG. 3A is exemplary graphical data depicting an exemplary component torque versus time during an engine autostart state and specifically showing torque for the crankshaft, accessories, and power torque machine, in accordance with the present disclosure.

FIG. 3A is exemplary graphical data depicting an embodiment of a exemplary component torque versus time graph during an autostart state (64) and specifically showing torque for the crankshaft 16, accessory brake 44, and torque machine 40. At time zero, the engine 12 is at its breakaway torque, as indicated by the graph of the crank shaft 16 at approximately 9 Nm, the torque machine 40 is at approximately 5 Nm, and the accessory brake 44 is reacting approximately 14 Nm to achieve a certain carrier output due to the gearing of the planetary gear set 22. The control algorithm 45 detects an engine restart condition and begins to increase the torque output of the torque machine 40. As the torque output for the torque machine 40 increases, the torque for crankshaft 16 and the accessory brake 44 reaction torque increases in a like amount thereby providing consistent output to the accessories 38. The motor 40 is at approximately 24 Nm at 0.25 s, while the crankshaft 16 is approximately 42 Nm and the accessory brake 44 is reacting approximately 66 Nm of torque. If the accessory brake 40 is a generator, the reacted torque, e.g., approximately 14 Nm at zero seconds and approximately 66 Nm at 0.25 s, is reacted to potential energy that can be stored within the ESD 46 or utilized immediately, e.g., running other electrical vehicle components. One of ordinary skill in the art will recognize this creates a consistent output for the accessories as will be described in relation to FIG. 3B.

Figure 3B:
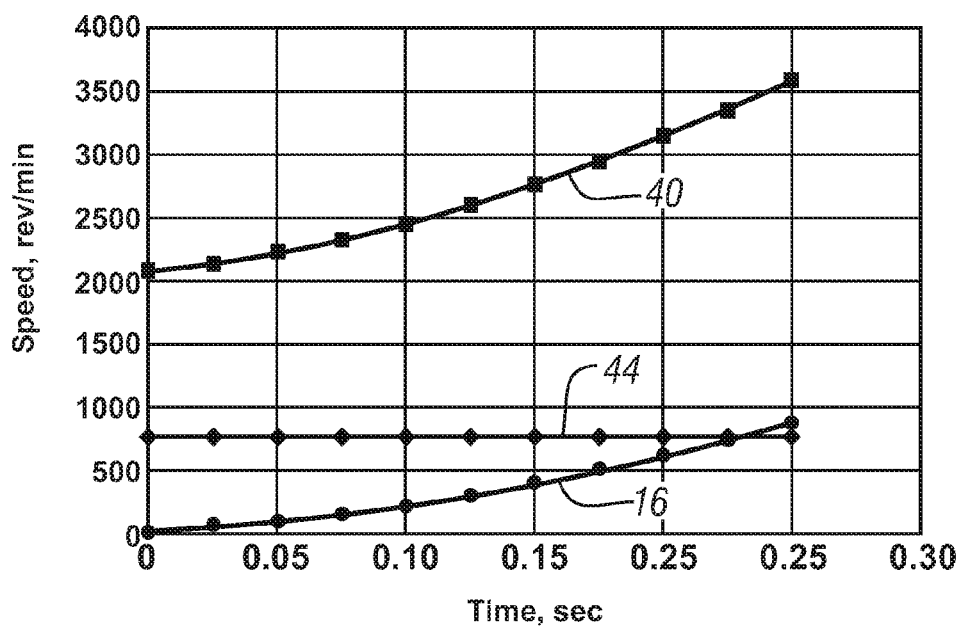
FIG. 3B is exemplary graphical data depicting a component speed graph over time and specifically showing crankshaft, accessories and power torque machine speeds in relation to FIG. 3A, in accordance with the present disclosure.

FIG. 3B is exemplary graphical data depicting an embodiment of a component speed over time graph and specifically showing crank shaft 16, accessories 38 and torque machine 40 speeds in relation to FIG. 3A. At time zero, the crankshaft 16 has reached its breakaway torque and is about to start spinning, the torque machine 40 has a speed of about 2100 rpm, and the accessories 38 have a speed of about 750 rpm. The controller 42 detects an engine restart condition and begins to increase the speed of torque machine 40 non-linearly. The speed of the crank shaft 16 begins to increase in a like fashion while the speed of the accessories 38 remains constant due to the torque reaction of the accessory brake 44 as described with relation to FIG. 3A. In approximately 0.25 seconds the speed of the crankshaft 16 reaches about 850 rpm, the speed of the torque machine 40 is approximately 3,600 rpm, and the accessories remain constant at approximately 750 rpm. Therefore, the accessories 38 spin at a predetermined speed and the torque produced by the torque machine 40 is transferred to the engine 12 thereby preventing accessory flair and converting torque from the torque machine 40 into torque for starting the engine 12. As will be apparent to one of ordinary skill in the art, the speed of the crankshaft at approximately 850 rpm indicates the engine 12 has started and is capable of producing its own torque by 0.25 s. It should be noted that the time 0.25 s is a targeted time for a feeling of instantaneous engine starting to an operator.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling operation of an internal combustion engine mechanically coupled via a planetary gear set to an accessory drive system and a torque machine, the method comprising:
   monitoring operator inputs;
   monitoring engine operation parameters;
   selecting a preferred operational state among a plurality of operational states in response to the operator inputs and the engine operation parameters for operating the engine, the torque machine and an accessory brake of the accessory drive system, the accessory brake comprising a potential energy conversion device configured to
      selectively accept torque from at least one of the engine and the torque machine transferred through the planetary gear set to control speed of the accessory drive system, and
      selectively transfer power to an energy storage device; and
   controlling the accessory drive system in the selected one of a plurality of operational states, the plurality of operational states comprising
      an engine autostop accessory control state including operating the torque machine in a torque generating state and transferring the generated torque to the accessory drive,
      an engine autostart state including operating the torque machine in the torque generating state and transferring the generated torque to the engine,
      an engine torque assist state including operating the torque machine in the torque generating state and transferring the generated torque to the engine, and
      an energy power generation state including operating the torque machine in a power generating state to react engine torque.

2. The method of claim 1, wherein the engine autostop accessory control state comprises operating the torque machine in the torque generating state comprising a torque output that is less than an engine breakaway torque.

3. A method for controlling operation of an internal combustion engine mechanically coupled via a planetary gear set to an accessory drive system and a torque machine, the method comprising:
   monitoring operator inputs;
   monitoring engine operation parameters; and
   controlling the accessory drive system in response to the operator inputs and the engine operation parameters in one of a plurality of operational states, comprising
      an engine autostop accessory control state including operating the torque machine in a torque generating state comprising a torque output that is less than an engine breakaway torque and transferring the generated torque to the accessory drive, wherein the engine autostop accessory control state further comprises applying an accessory brake to a member of the planetary gear set, an engine autostart state including operating the torque machine in the torque generating state and transferring the generated torque to the engine, an engine torque assist state including operating the torque machine in the torque generating state and transferring the generated torque to the engine, and an energy power generation state including operating the torque machine in a power generating state to react engine torque.

4. The method of claim 2, wherein the engine autostop accessory control state further comprises:

determining that operation of an accessory coupled to the accessory drive system is necessary;

determining an operating parameter associated with an energy storage device; and operating the torque machine in the torque generating state so long as the operating parameter associated with the energy storage device exceeds a predetermined level.

5. The method of claim 1, wherein the engine autostart state comprises determining an operator torque request is imminent based upon the monitored operator input commands.

6. A method for controlling operation of an internal combustion engine mechanically coupled via a planetary gear set to an accessory drive system and a torque machine, the method comprising:

monitoring operator inputs;

monitoring engine operation parameters; and controlling the accessory drive system in response to the operator inputs and the engine operation parameters in one of a plurality of operational states, comprising an engine autostop accessory control state including operating the torque machine in a torque generating state and transferring the generated torque to the accessory drive, an engine autostart state including operating the torque machine in the torque generating state and transferring the generated torque to the engine, wherein the engine autostart state comprises actuating an accessory brake coupled to the planetary gear set to restrict transfer of the generated torque to the accessory drive system, an engine torque assist state including operating the torque machine in the torque generating state and transferring the generated torque to the engine, and an energy power generation state including operating the torque machine in a power generating state to react engine torque.

7. The method of claim 1, wherein the engine torque assist state comprises:

determining that an operator torque request has exceeded a predetermined level;

determining an operating parameter associated with the energy storage device; and operating the torque machine in the torque generating state so long as the operating parameter associated with the energy storage device exceeds a predetermined level.

8. A method for controlling operation of an internal combustion engine mechanically coupled via a planetary gear set to an accessory drive system and a torque machine, the method comprising:

monitoring operator inputs;

monitoring engine operation parameters; and controlling the accessory drive system in response to the operator inputs and the engine operation parameters in one of a plurality of operational states, comprising an engine autostop accessory control state including operating the torque machine in a torque generating state and transferring the generated torque to the accessory drive, an engine autostart state including operating the torque machine in the torque generating state and transferring the generated torque to the engine, an engine torque assist state including operating the torque machine in the torque generating state and transferring the generated torque to the engine comprising determining that an operator torque request has exceeded a predetermined level, determining an operating parameter associated with the energy storage device, operating the torque machine in the torque generating state so long as the operating parameter associated with the energy storage device exceeds a predetermined level, and actuating an accessory brake coupled to the planetary gear set to restrict transfer of the generated torque to the accessory drive system, and an energy power generation state including operating the torque machine in a power generating state to react engine torque.

9. The method of claim 1, wherein the power generating state comprises determining that none of the other operational states are active.

10. A method for controlling operation of an internal combustion engine mechanically coupled via a planetary gear set to an accessory drive system and a torque machine, the method comprising:

monitoring operator inputs;

monitoring engine operation parameters; and controlling the accessory drive system in response to the operator inputs and the engine operation parameters in one of a plurality of operational states, comprising an engine autostop accessory control state including operating the torque machine in a torque generating state and transferring the generated torque to the accessory drive, an engine autostart state including operating the torque machine in the torque generating state and transferring the generated torque to the engine, an engine torque assist state including operating the torque machine in the torque generating state and transferring the generated torque to the engine, and an energy power generation state including operating the torque machine in a power generating state to react engine torque, wherein the power generating state comprises determining that none of the other operational states are active, and actuating an accessory brake coupled to the planetary gear set to restrict torque transfer to the accessory drive system.

11. A method for controlling operation of an internal combustion engine mechanically coupled via a planetary gear set to an accessory drive system and a torque machine, wherein the accessory drive system includes an accessory brake, the method comprising:

monitoring operator inputs;

monitoring engine operation parameters;

selecting one of a plurality of operational states for operating the engine, the accessory drive system, and the torque machine in response to the operator inputs and the engine operation parameters; and operating the engine, the accessory brake of the accessory drive system, and the torque machine in the selected operational state to control speed of accessories included in the accessory drive, the accessory brake comprising a potential energy conversion device configured to
- selectively accept torque from the engine and the torque machine transferred through the planetary gear set to control speed of the accessories included in the accessory drive, and
- selectively transfer power to an energy storage device.

12. The method of claim 11, wherein the plurality of operational states comprises an autostop accessory control state, an autostart state, an engine torque assist state, and an energy power generation state.

13. The method of claim 12, wherein operating the engine, the accessory drive system, and the torque machine in the autostop accessory control state comprises:
- determining is accessory operation is required;
- determining if the energy storage device is above a predetermined level; and
- operating the torque machine in a torque generation mode when the accessory operation is required and the energy storage device is above the predetermined level.

14. A method for controlling operation of an internal combustion engine mechanically coupled via a planetary gear set to an accessory drive system and a torque machine, wherein the accessory drive system includes an accessory brake, the method comprising:
- monitoring operator inputs;
- monitoring engine operation parameters;
- selecting one of a plurality of operational states for operating the engine, the accessory drive system, and the torque machine in response to the operator inputs and the engine operation parameters, wherein the plurality of operational states comprises an autostop accessory control state, an autostart state, an engine torque assist state, and an energy power generation state; and
- operating the engine, the accessory drive system, and the torque machine in the selected operational state to control speed of accessories included in the accessory drive, wherein operating the engine, the accessory drive system, and the torque machine in the autostart state comprises:
  - operating the torque machine in a torque generation state, and
  - operating the accessory brake to control accessory speed.

15. A method for controlling operation of an internal combustion engine mechanically coupled via a planetary gear set to an accessory drive system and a torque machine, wherein the accessory drive system includes an accessory brake, the method comprising:
- monitoring operator inputs;
- monitoring engine operation parameters;
- selecting one of a plurality of operational states for operating the engine, the accessory drive system, and the torque machine in response to the operator inputs and the engine operation parameters, wherein the plurality of operational states comprises an autostop accessory control state, an autostart state, an engine torque assist state, and an energy power generation state; and
- operating the engine, the accessory drive system, and the torque machine in the selected operational state to control speed of accessories included in the accessory drive, wherein operating the engine, the accessory drive system, and the torque machine in the engine torque assist state comprises:
  - monitoring operator commands,
  - determining if an operator torque request exceeds a predetermined limit,
  - determining if an energy storage device has power above a predetermined level, and
  - operating the torque machine in the engine torque assist state when the operator torque request exceeds the predetermined limit and the energy storage device has power above the predetermined level, wherein the engine torque assist state comprises operating the torque machine in a torque generation state and operating the accessory brake to control accessory speed.

16. The method of claim 12, wherein the energy power generation state comprises:
- controlling accessory speed to a predetermined level; and
- controlling the power torque machine in a power generation mode.

* * * * *